Sept. 27, 1955     J. W. HARPER ET AL     2,719,109
REGENERATION OF AQUEOUS ALKALINE SOLUTIONS
Filed Nov. 9, 1950
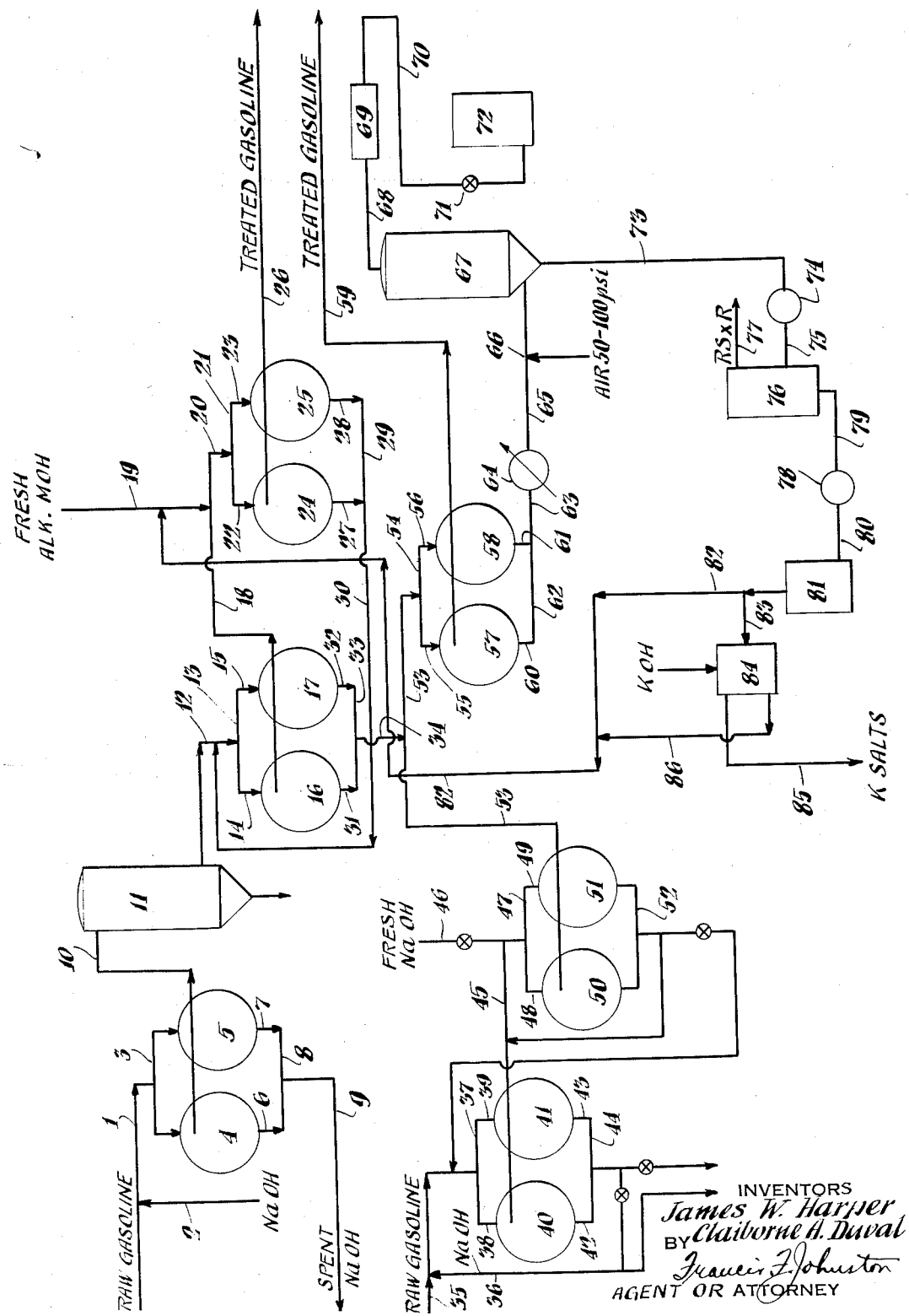
INVENTORS
*James W. Harper*
*Claiborne A. Duval*
BY *Francis F. Johnston*
AGENT OR ATTORNEY

United States Patent Office 2,719,109
Patented Sept. 27, 1955

---

2,719,109

REGENERATION OF AQUEOUS ALKALINE SOLUTIONS

James W. Harper and Claiborne A. Duval, Beaumont, Tex., assignors to Socony Mobil Oil Company, Inc., a corporation of New York Application November 9, 1950, Serial No. 194,832

6 Claims. (Cl. 196—32)

---

The present invention relates to the regeneration of aqueous alkaline solutions which have been employed to extract organic sulfhydryls from organic mixtures and, more particularly, to the regeneration of aqueous alkaline solutions in which organic sulfhydryls have been oxidized to polysulfides by an oxidizing gas such as air.

For several years it has been known that organic sulfhydryls, having a composition corresponding to the formula, RSH wherein R is an alkyl group, or an aryl group could be extracted from mixtures of hydrocarbons by means of aqueous alkaline solutions containing or devoid of materials known to those skilled in the art as solutizers. For economic operation it is necessary that these aqueous alkaline solutions be regenerated with respect to their ability to extract the organic sulhydryls or mercaptans. The earliest method of regeneration was by steaming the fat or fouled solution to remove the mercaptans dissolved or dispersed therein. More recently, the advantages of oxidation of the mercaptans to polysulfides have been recognized.

While the mercaptans or the alkali metal salts thereof, i. e., mercaptides, can be oxidized with air in the presence of catalysts such as nickel sulfide or in the presence of phenolic oxidation promoters such as di- or tri-hydroxybenzenes, di- or tri-hydroxybenzene carboxylic acid, tannins and the like, it has been known that these sulfhydryls or mercaptans can be oxidized in strongly alkaline solution in the absence of any of the foregoing catalysts or oxidation promoters with air at atmospheric pressure or at superatmospheric pressure.

One of the factors which must be considered when regenerating aqueous alkaline solutions which have been used to extract sulfhydryls from hydrocarbon mixtures by oxidizing with an oxidizing gas such as air in the presence of an oxidizing promoter such as a phenolic oxidation promoter is the inactivation of the oxidation promoter during regeneration when the sulfhydryl concentration is reduced below a value dependent upon the particular phenolic oxidation promoter employed and the concentration thereof.

When regenerating these aqueous alkaline solutions in the absence of a catalyst or oxidation promoter care also must be exercised to only oxidize a portion of the sulfhydryl present in the fouled aqueous alkaline solution. When all of the sulfhydryl present in the fat solution is oxidized by air in the absence of a catalyst or oxidation promoter the free metal hydroxide of the aqueous alkaline solution is neutralized by products of the oxidation reaction. However, during the oxidation acidic materials are produced from some components of the aqueous alkaline solution which oxidation products neutralize a portion of the free alkaline metal hydroxide of the aqueous alkaline solution. Such degradation of the aqueous alkaline solution and subsequent loss of extractive capability could be overcome to some extent by oxidizing only a major portion of the mercaptides present in the fat solution. However, such a regenerated solution has a limited capability for the extraction of further amounts of mercaptans dependent upon the re-entry value of the partially regenerated solution.

It has now been discovered that the difficulties attendant upon the more complete oxidation of the mercaptides present in a fat aqueous alkaline solution can be overcome in a relatively simple manner.

It is an object of the present invention to remove organic salts and oxidation products present in a regenerated aqueous alkaline solution. It is another object of the present invention to provide a means for minimizing difficulties arising from the tendency of regenerated aqueous alkaline solutions to form emulsions. It is a further object of the present invention to provide a means for recovering phenolic compounds and related organic substances. The present invention also has as an object the maintenance of the concentration of free alkali metal hydroxide in aqueous alkaline treating solution. Other objects and differences will become apparent from the following description.

Broadly stated the present invention provides for the salting-out of the salts produced by the neutralization of the free alkaline metal hydroxide concentration of the regenerated solution by the acidic materials produced during regeneration.

In addition to the organic acids produced during regeneration, in many instances materials such as phenols and organic acids are present in the hydrocarbon mixture in addition to the mercaptans which are to be removed. These phenols and organic acids present in the hydrocarbon mixture are absorbed by the aqueous alkaline solution and also reduce the concentration of free metal hydroxide. The salts formed in the aqueous alkaline solution by the reaction between the alkaline metal hydroxide and the phenols and/or organic acids present in the hydrocarbon mixture also are removed in the salting-out process.

It has been discovered that the concentration of organic acids, i. e., the alkaline metal hydroxide salts thereof, must be considered when salting-out these materials. Thus, for example, when organic acids, i. e., phenols or carboxylic acids, are added to a 44° Baumé aqueous solution of potassium hydroxide in amounts sufficient to provide concentrations of 3 per cent, 5 per cent and 8 per cent, the potassium salts of the organic acids formed an upper layer which could readily be separated from the remainder of the aqueous alkaline solution. On the other hand, when sufficient of these acidic materials were added to a 44° Baumé aqueous solution of potassium hydroxide to provide concentrations of 12 per cent, 16 per cent and 20 per cent, a homogeneous mixture resulted from which the potassium salts could not be separated. Furthermore, when aqueous potassium hydroxide solutions containing 12 per cent of the aforesaid organic acids were vigorously agitated and allowed to remain quiescent at 150° F. solutions which originally had gravities of 30°, 35° and 40° Baumé gave homogenous solutions from which the potassium salts cannot be mechanically separated. On the other hand, when the original gravity of the aqueous potassium hydroxide solution was higher than 45° Baumé the potassium salts of the organic acids formed an upper layer which could be readily separated mechanically.

Furthermore, salting-out occurs at a definite temperature which is specific for individual systems of potassium hydroxide, organic acids and water. The salting-out temperature is lowered by lowering the concentration of potassium hydroxide. At low temperatures the relative volume of the salted-out layer decreases but the concentration of phenolates in this layer increases.

In further illustration of the criticality of the gravity of the solution from which alkaline metal hydroxide salts of organic acids are to be separated is the following data:

Table I

| Run | Parts by Volume Regenerated Solution (Ml.) | Solid KOH, Gms. | Grav., ° Bé. | Upper Layer | | | Lower Layer | | |
|---|---|---|---|---|---|---|---|---|---|
| | | | | Ml. | ° Bé. | Organic Acid, Vol. Percent | Ml. | ° Bé. | Organic Acid, Vol. Percent |
| A [1] | 100 | 30 | 43-7 | (110) | | (10) | | | |
| B | 100 | 40 | 46-0 | 45 | 43-2 | 23 | 73-5 | 47-4 | 4-0 |
| C | 100 | 45 | 46-3 | 45 | 43-4 | 24 | 73 | 47-8 | 2-0 |
| D | 100 | 50 | 46-6 | 40 | 42-7 | 28 | 82 | 49-6 | 2-0 |
| E | 100 | 60 | 49-2 | 35 | | 44 | 90 | 51-4 | Trace |

[1] Upper layer did not occur.

In order to obtain the data presented in the preceding table, refinery treating solution which had been regenerated and had a gravity of 34.9° Baumé was filtered and the amounts of solid potassium hydroxide indicated in column 3 added. After the addition of the solid caustic potash, the solution with adjusted gravity was allowed to stand quiescent for 2 hours at a temperature of 90° F. Thereafter (runs B, C, D and E) the upper layer (containing the potassium salts of the organic acids) was separated from the lower layer. It will be noted that when the solution of adjusted gravity had a gravity of about 43.7° Baumé no separation occurred and a homogeneous solution resulted. However, at 46° Baumé gravity some separation occurred and that excellent separation was obtained with a solution having an adjusted gravity of 49.2° Baumé.

For the convenience of those skilled in the art, the following tabulation of the correlation between the concentration of potassium hydroxide and gravity of aqueous solutions devoid of organic acids are:

Table II

| Grav., ° Bé. | KOH, Wt. Per cent |
|---|---|
| 30 | 27.2 |
| 35 | 32.5 |
| 40 | 38.3 |
| 44 | 43.2 |
| 45 | 44.4 |
| 50 | 51 |

Illustrative of the application of this invention to refinery practice is a sequence of operations illustrated more or less in a diagrammatic manner by the flow-sheet of the drawings. In the particular operation it is desirable to treat a cracked gasoline in which the mercaptans are light mercaptans, i. e., methyl, ethyl, propyl, and a straight run gasoline wherein the heavy mercaptans, $C_4$ and higher predominate. Raw visbreaker gasoline from a source not shown is drawn through line 1. An aqueous solution of caustic soda drawn from a source not shown through line 2 is mixed with the raw gasoline in line 1 and the mixture passes through line 1 to manifold 3 into settlers 4 and 5. Spent caustic soda solution is withdrawn from settlers 4 and 5 through lines 6 and 7, manifold 8 and line 9. The prewashed gasoline from settlers 4 and 5 passes through line 10 to coalescer 11. Preferably coalescer 11 is packed with glass wool. In coalescer 11 entrained water, alkali metal hydroxide and sulfide are removed and the prewashed gasoline withdrawn through pipe 12 from the coalescer. The prewashed gasoline passes through line 12 to an extraction and settling operation in which the prewashed gasoline is contacted with an aqueous potassium hydroxide solution containing as a solutizer alkyl phenols. The aqueous solution of potassium hydroxide from the second stage of the extraction and settling operation is brought in contact with the prewashed gasoline in line 12. The mixture passes through manifold 13, pipes 14 and 15 to settlers 16 and 17. The partially demercaptanized gasoline passes from settlers 16 and 17 through pipe 18 into which is introduced a fresh aqueous solution of caustic potash drawn from storage from line 19. The mixture passes through line 20, manifold 21 and lines 22 and 23 to settlers 24 and 25 from which the treated demercaptanized gasoline is withdrawn through line 26 to storage or further treating operations if desirable. The partially fouled potassium hydroxide solution is withdrawn from settlers 24 and 25 by lines 27 and 28, respectively, to manifold 29 and passed through line 30 to pipe 12 where it contacts a further amount of prewashed gasoline. Spent or fat potassium hydroxide solution is withdrawn from settlers 16 and 17 through lines 31 and 32, respectively, and manifold 33 and passed through line 34 to the treating section in which prewashed straight run gasoline is treated.

Straight run gasoline is withdrawn from a source not shown through line 35 into which an aqueous solution of caustic soda is introduced through line 36 from a source not shown. The mixture of straight run gasoline and aqueous caustic soda solution passes through line 35 to manifold 37 and through pipes 38 and 39 to settlers 40 and 41 from which the caustic soda solution can be withdrawn when desired through lines 42 and 43 and manifold 44 and circulated to line 35 until the caustic solution in vessels 40 and 41 is spent and discarded. The prewashed gasoline passes from the first stage through line 45 into which a further amount of caustic soda solution is introduced through line 46 from a source not shown. The mixture of aqueous caustic soda solution and partially prewashed gasoline passes through pipe 45 to manifold 47 and thence through lines 48 and 49 to settlers 50 and 51. Caustic soda solution is withdrawn from settlers 50 and 51 through manifold 52 and is circulated to line 45 until the solution in vessels 40 and 41 is spent and discarded at which time the solution in vessels 50 and 51 is pumped to vessels 40 and 41. Then fresh caustic soda solution is pumped into vessels 50 and 51. The prewashed gasoline passes through line 53 to the treating section. Caustic potash solution is introduced into line 53 from settlers 16 and 17 through line 34. The mixture of partially fouled caustic potash solution from settlers 16 and 17 and the prewashed straight run gasoline passes through line 53 to manifold 54 and through lines 55 and 56 is introduced into settlers 57 and 58. The treated gasoline is withdrawn from settlers 57 and 58 through line 59. Fouled or fat caustic potash solution is withdrawn from settlers 57 and 58 through lines 60 and 61, manifold 62 and line 63 to heater 64. The heated fat caustic potash solution passes from heater 64 through line 65. Air at a pressure of 50 to 100 pounds p. s. i. g. is introduced into line 65 at a point such as 66 and the mixture of fat caustic potash solution and oxidizing air is then introduced into a separating chamber 67 in which excess gas and volatile constituents of the caustic potash solution are separated from the regenerated caustic potash solution. Excess air and volatile constituents are withdrawn from separator 67 through 68 to heater 69 from which combustible gas in admixture with air is withdrawn through line 70, the pressure reduced at valve 71 and the mixture burned in furnace 72. The regenerated caustic potash solution leaves separator 67 through line 73 and is pumped by pump 74 through line 75 to settler 76. In settler 76 the disulfides rise to the top and are withdrawn through line 77 while the regenerated caustic solution is withdrawn from settler by pump 78 through line 79. The regenerated caustic potash solution is discharged by pump 78 through line 80 to a filter 81. A suitable filter is one known to the art as an "anthrafilter" which comprises a suitable container with suitable inlets and outlets containing anthracite coal in sufficient amounts to form a filter bed. The filtered regenerated caustic potash solution leaves the filter through line 82 and is returned to line 19 for treatment of further amounts of prewashed gasoline containing predominantly light mercaptans. When it is necessary to adjust the gravity of the regenerated caustic potash solution in order to separate the potassium salts of the organic acids which are extracted from the raw gasoline or generated during the regeneration of the caustic potash extraction solution, a portion or the whole of the stream of the regenerated caustic potash solution is diverted from line 82 throlgh line 83 to mixer 84. Solid caustic potash, preferably in flake form or aqueous solutions of caustic potash of higher concentration than that of fresh extraction caustic potash solution is introduced into mixer 84 in any suitable manner. When desirable or necessary mixer 84 can be provided with suitable means, for example a steam coil, for heating the regenerated caustic potash solution to evaporate all of the water necessary to yield a solution of the critical potash concentration at which salting-out occurs. Alternatively, the concentration of potash in the regenerated caustic potash solution can be raised to the critical salting-out concentration partly by evaporation and partly by the addition of solid potash or of aqueous solutions of caustic potash of higher concentration than that of the concentrated regenerated solution. The fortified regenerated caustic potash solution is then cooled to the critical salting-out temperature, and preferably below the critical salting-out temperature, and held quiescent for a period of time sufficient to permit the potassium salts of the acidic materials in the regenerated solution to settle out. The solution of salted-out salts is withdrawn from mixer 84 through line 85 for further treatment when desired to recover the caustic potash therein. The fortified regenerated caustic potash solution is then withdrawn through line 86 to line 82 and transferred to line 19.

In view of the foregoing discussion, it will be manifest to those skilled in the art that the present invention provides for raising the gravity of regenerated alkaline metal hydroxide solution to at least 43° Baumé and separating a layer containing the major portion of the acidic material present in the regenerated caustic potash solution by gravity at a temperature of at least 90° F. and less than the boiling point of the fortified solution, the gravity of the fortified caustic potash solution being higher, the greater the concentration of acidic material and the higher the temperature, but not less than about 44° Baumé for regeneration of fortified solutions containing up to about 10 per cent of organic acid material for separation at 150° F. or less and being at least 45° Baumé for solutions containing 12 per cent of organic acids when separated at 150° F.

We claim:

1. In the method of treating hydrocarbon fluids containing mercaptans for the removal thereof which comprises contacting a hydrocarbon fluid containing mercaptans with an aqueous alkaline treating solution, separating treated hydrocarbon fluid from aqueous alkaline treating solution containing extracted mercaptans in the form of mercaptides, contacting said separated aqueous alkaline treating solution containing said mercaptides with gas containing free oxygen to convert said mercaptides to polysulfides and concomitantly produce acidic organic material reacting with the alkali metal of said aqueous alkaline treating solution to form alkali metal salts thereof, separating said polysulfides from said aqueous alkaline treating solution containing said concomitantly produced alkali metal salts to obtain a regenerated aqueous alkaline treating solution containing said concomitantly produced salts, and contacting hydrocarbon fluid containing mercaptans with said regenerated solution, the improvement which comprises raising to at least 44° Baumé the density of said regenerated solution, holding said regenerated solution having a density of at least 44° Baumé quiescent until there is formed a top layer comprising said concomitantly produced salts of acidic organic material and a bottom layer comprising an aqueous alkaline treating solution having a reduced concentration of the aforesaid concomitantly produced salts, separating said bottom layer from said top layer, and contacting hydrocarbon fluid containing mercaptans with the aforesaid bottom layer.

2. The improvement in the method of treating hydrocarbon fluids containing mercaptans for the removal thereof as set forth and described in claim 1, wherein the regenerated aqueous alkaline treating solution comprises an aqueous solution of potassium hydroxide and the separation of the bottom layer from the top layer takes place at at least about 90° F. but not higher than about 150° F.

3. In the method of treating hydrocarbon fluids containing mercaptans for the removal thereof which comprises contacting a hydrocarbon fluid containing acidic organic material including mercaptans with an aqueous alkaline treating solution, separating treated hydrocarbon fluid from aqueous alkaline treating solution containing extracted acidic organic material in the form of alkali metal salts thereof including mercaptides, separating mercaptides from said aqueous alkaline treating solution to obtain a regenearted aqueous alkaline treating solution of reduced mercaptide content but containing said salts of extracted acidic organic material other than mercaptides, and contacting hydrocarbon fluid containing mercaptans with said regenerated aqueous alkaline treating solution, the improvement which comprises raising to at least 44° Baumé the density of said regenerated aqueous alkaline treating solution, holding quiescent said regenerated aqueous alkaline treating solution having a density of at least 44° Baumé until there is formed an upper layer comprising said salts of extracted acidic organic material and a bottom layer comprising aqueous alkaline treating solution having a reduced concentration of the aforesaid salts of extracted acidic organic material, separating said bottom layer from said upper layer and contacting hydrocarbon fluid containing mercaptans with said bottom layer.

4. The improvement in the method of treating hydrocarbon fluids containing mercaptans for the removal thereof as set forth and described in claim 3 wherein the regenerated aqueous alkaline treating solution comprises an aqueous solution of potassium hydroxide and the separation of the bottom layer from the top layer takes place at at least about 90° F. but not higher than about 150° F.

5. In the method of treating hydrocarbon fluids containing mercaptans for the removal thereof which comprises contacting a hydrocarbon fluid containing mercaptans with an aqueous alkaline treating solution, separating treated hydrocarbon fluid from aqueous alkaline treating solution containing mercaptides in the form of mercaptides, separating mercaptides from said aqueous alkaline treating solution to obtain an aqueous alkaline treating solution having a greater concentration of salts of acidic organic material than that of the aqueous alkaline treating solution initially employed but regenerated with respect to mercaptides, and contacting hydrocarbon fluid containing mercaptides with said aqueous alkaline treating solution regenerated with respect to marcaptides, the improvement which comprises raising to at least 44° Baumé the density of said aqueous alkaline treating solution regenerated with respect to marcaptides, holding quiescent said aqueous alkaline treating solution having a density of at least 44° Baumé until there is formed an upper layer comprising the aforesaid salts of acidic organic material and a lower layer comprising aqueous alkaline treating solution having a reduced concentration of said salts of acidic organic material, separating said lower layer from said upper layer, and contacting hydrocarbon fluid containing mercaptans with said lower layer.

6. The improvement in the method of treating hydrocarbon fluids containing mercaptans for the removal thereof as set forth and described in claim 5 wherein the aqueous alkaline treating solution regenerated with respect to mercaptans comprises an aqueous solution of potassium hydroxide, and the separation of the lower layer from the upper layer takes place at at least about 90° F. but not higher than about 150° F.

References Cited in the file of this patent

UNITED STATES PATENTS

| | | |
|---|---|---|
| 2,084,575 | Day | June 22, 1937 |
| 2,228,028 | Brower | Jan. 7, 1941 |
| 2,297,537 | Craig et al. | Sept. 29, 1942 |
| 2,431,770 | Payne et al. | Dec. 2, 1947 |
| 2,457,975 | Bolt | Jan. 4, 1949 |
| 2,474,028 | Berger | June 21, 1949 |
| 2,556,438 | Parker et al. | June 12, 1951 |
| 2,560,178 | Krause et al. | July 10, 1951 |
| 2,591,946 | Krause et al. | Apr. 8, 1952 |